United States Patent
Handelman et al.

(10) Patent No.: US 8,744,215 B2
(45) Date of Patent: Jun. 3, 2014

(54) METHODS AND PROCESSES TO AGGREGATE MULTIPLE IMAGE FEEDS AND DYNAMICALLY SELECT COMMAND REFERENCE FRAMES

(75) Inventors: David A. Handelman, Princeton, NJ (US); Haldun Komsuoglu, Philadelphia, PA (US); Gordon H. Franken, New York, NY (US)

(73) Assignee: American Android Corp., Highland, MD (US)

(*) Notice: Subject to any disclaimer, the term of this patent is extended or adjusted under 35 U.S.C. 154(b) by 260 days.

(21) Appl. No.: 13/169,797

(22) Filed: Jun. 27, 2011

(65) Prior Publication Data

US 2011/0320042 A1    Dec. 29, 2011

Related U.S. Application Data

(60) Provisional application No. 61/359,174, filed on Jun. 28, 2010, provisional application No. 61/358,417, filed on Jun. 25, 2010.

(51) Int. Cl.
*G06K 9/36* (2006.01)
*G06K 9/00* (2006.01)
*G06F 19/00* (2011.01)

(52) U.S. Cl.
USPC .......................... 382/285; 382/153; 700/245

(58) Field of Classification Search
USPC ......... 382/153, 154, 276, 284, 285, 305, 312; 700/245, 259, 275; 606/1
See application file for complete search history.

(56) References Cited

U.S. PATENT DOCUMENTS

| 5,297,238 A * | 3/1994 | Wang et al. ................... 700/259 |
| 8,114,097 B2 * | 2/2012 | Brock et al. ................... 606/130 |
| 8,123,740 B2 * | 2/2012 | Madhani et al. .................. 606/1 |
| 8,335,590 B2 * | 12/2012 | Costa et al. ................... 700/259 |
| 8,414,469 B2 * | 4/2013 | Diolaiti ......................... 600/102 |

* cited by examiner

*Primary Examiner* — Kanjibhai Patel
(74) *Attorney, Agent, or Firm* — Stradley Ronon Stevens & Young, LLP

(57) ABSTRACT

Methods and systems to improve operator control of mobile robots are disclosed. The invention comprises in various embodiments the aggregation of multiple image feeds to improve operator situational awareness and the dynamic selection of command reference frames to improve operator intuitive control. The disclosed methods and systems reduce operator workload, reduce task completion times, and extend the capabilities of mobile manipulation systems.

14 Claims, 15 Drawing Sheets

METHODS AND PROCESSES TO AGGREGATE MULTIPLE IMAGE FEEDS AND DYNAMICALLY SELECT COMMAND REFERENCE FRAMES

RELATED APPLICATION

This application claims the benefit of priority to U.S. Provisional Patent Application Ser. No. 61/358,417, filed on Jun. 25, 2010, and U.S. Provisional Patent Application Ser. No. 61/359,174, filed on Jun. 28, 2010, the contents of which are both incorporated in this application by reference.

STATEMENT OF GOVERNMENT SUPPORT

The inventions described herein were made, in part, with funds obtained from the United States Department of Defense, Contract No. W56HZV-09-C-0034. The United States government may have certain rights in these inventions.

TECHNICAL FIELD

The present invention relates generally to display and control systems used in the field of robotics, and more particularly, to methods for displaying images and video data aggregated from multiple camera feeds using known kinematic relationships as between the camera feeds, and to methods for dynamically selecting control or command reference frames to assist in control of the robot.

BACKGROUND OF THE INVENTION

The use of remotely controlled robots has seen substantial increase in many fields. For the military and law enforcement, robots are being used to inspect otherwise dangerous or hazardous locations and objects, such as suspected explosive devices or hazardous materials. Moreover, in the area of hazardous environments, such as nuclear facilities, robots are being used to monitor radiation levels and simply to provide users a "set of eyes" within the hazardous environment. Two prominent examples of such robotic systems are dual-arm robots used by the oil and gas industry for remote mobile manipulation on the ocean floor, and the robots used to provide environmental information from within the disabled Fukushima Daiichi nuclear reactor in Japan.

The remote control of such robots is generally undertaken through an image or visual feed, or multiple image or visual feeds, taken from cameras located on the robot and fed back to remote monitors and screens through which the user or robot controller views and interprets the image or visual feeds. Such an image or visual feed and monitor provide limited information to the user. For example the monitor displays a limited field of view image, in that the image provided is only what the camera or video sees. Further, the image presented to the user through the monitor is essentially two-dimensional. Such limitations require the user to expend substantial time and effort to interpret and understand the robot images, and the robot's contextual surroundings.

With respect to robotic control systems, such systems typically use a single fixed reference frame through which the user interprets task requirements and accordingly command inputs. The usual single reference frame is the "world coordinates" or a joint space viewed by the robot. While some research has been undertaken to use "end-effector" coordinates for command interpretation, there has not been a control system infrastructure that permits dynamically alterable control reference frames through which to apply control inputs. Given that the operator has limited situational awareness as noted above, such reference frame limitations result in a substantial mental interpretative load on the operator or user to associated image or visual feedback and appropriate control inputs.

Accordingly, it would be highly desirable to provide methods and systems for enhanced operator situational awareness using improved aggregation of multiple image feeds and intuitive operator control using improved dynamically selectable command reference frames.

BRIEF SUMMARY OF THE INVENTION

According to an exemplary embodiment of the present invention, a method is disclosed to aggregate image feeds and map user commands, for use in control of robotic systems, comprising the steps of (a) identifying at least two image feeds to be aggregated into a single image; (b) identifying kinematic relationships of each of the at least two image feeds as related to each other and as related to another reference frame; (c) computing kinematic transformations required for each of the at least two image feeds to transform such image feeds consistent with said reference frame; (d) applying the kinematic transformations computed to each of the respective at least two image feeds; (e) combining the transformed at least two image feeds into a single image, such single image having transformed and combined image feeds; (f) identifying at least two reference frames to which user commands may be mapped; (g) selecting a control reference frame from the at least two reference frames, said control reference frame having a first reference frame; (h) sensing user commands entered through an input device, said input device having a second reference frame; and (i) mapping the sensed user commands from the input device and the input device second reference frame, to the control reference frame and the control reference frame having a first reference frame.

According to another exemplary embodiment of the present invention, a method is disclosed to transform and aggregate image feeds, for use in robotics, comprising the steps of (a) identifying at least two image feeds to be aggregated into a single image; (b) identifying kinematic relationships of each of the at least two image feeds as related to each other and as related to another reference frame; (c) computing kinematic transformations required for each of the at least two image feeds to transform such image feeds consistent with said reference frame; (d) applying the kinematic transformations computed to each of the respective at least two image feeds; and (e) combining the transformed at least two image feeds into a single image, such single image having transformed and combined image feeds.

According to a further exemplary embodiment of the present invention, a method is disclosed to map user commands to selectable system reference frames, comprising the steps of (a) identifying at least two reference frames to which user commands may be mapped; (b) selecting a control reference frame from the at least two reference frames, said control reference frame having a first reference frame; (c) sensing user commands entered through an input device, said input device having a second reference frame; and (d) mapping the sensed user commands from the input device with a second reference frame, to the control reference frame with a first reference frame.

According to another exemplary embodiment of the present invention, a system for aggregating image feeds for use in robotics controls, comprising a plurality of image feeds which may be combined into a single image; a kinematic relationship relating each of the plurality of image feeds to each other; an independent reference frame; a kinematic relationship relating each of the plurality of image feeds to the independent reference frame; an operator monitor to which said single image may be displayed; and a computer processor in communication with said plurality of image feeds; wherein said computer processor computes the kinematic transformations required for each of the plurality of image feeds to transform such image feeds consistent with said independent reference frame; applies the kinematic transformations computed to each of the respective plurality of image feeds; and combines the transformed plurality of image feeds into a single image, such single image, having transformed and combined image feeds, being displayed to said operator monitor.

According to still another exemplary embodiment of the present invention, a system for mapping user commands to selectable system reference frames, for use in robotics, comprising a controller having a controller reference frame; a camera having a camera reference frame; a body having a body reference frame; and a computer processor in communication with said controller, body and camera; wherein said computer processor first identifies the controller reference frame, body reference frame, and camera reference frame; second selects a control reference frame from one of the body reference frame, or camera reference frame; third senses user commands entered through the controller; and fourth maps the sensed user commands to the selected control reference frame.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Described and disclosed herein, and as previously described in the priority provisional patent applications (Provisional Patent Application Ser. Nos. 61/358,417 and 61/359,174) both of which are incorporated herein by reference, and as according to exemplary and preferred embodiments, are methods and related systems as used for robotics to aggregate multiple image or visual feeds having distinct sources, and to map user commands from an input device to selectable distinct reference frame.

Figure 1:
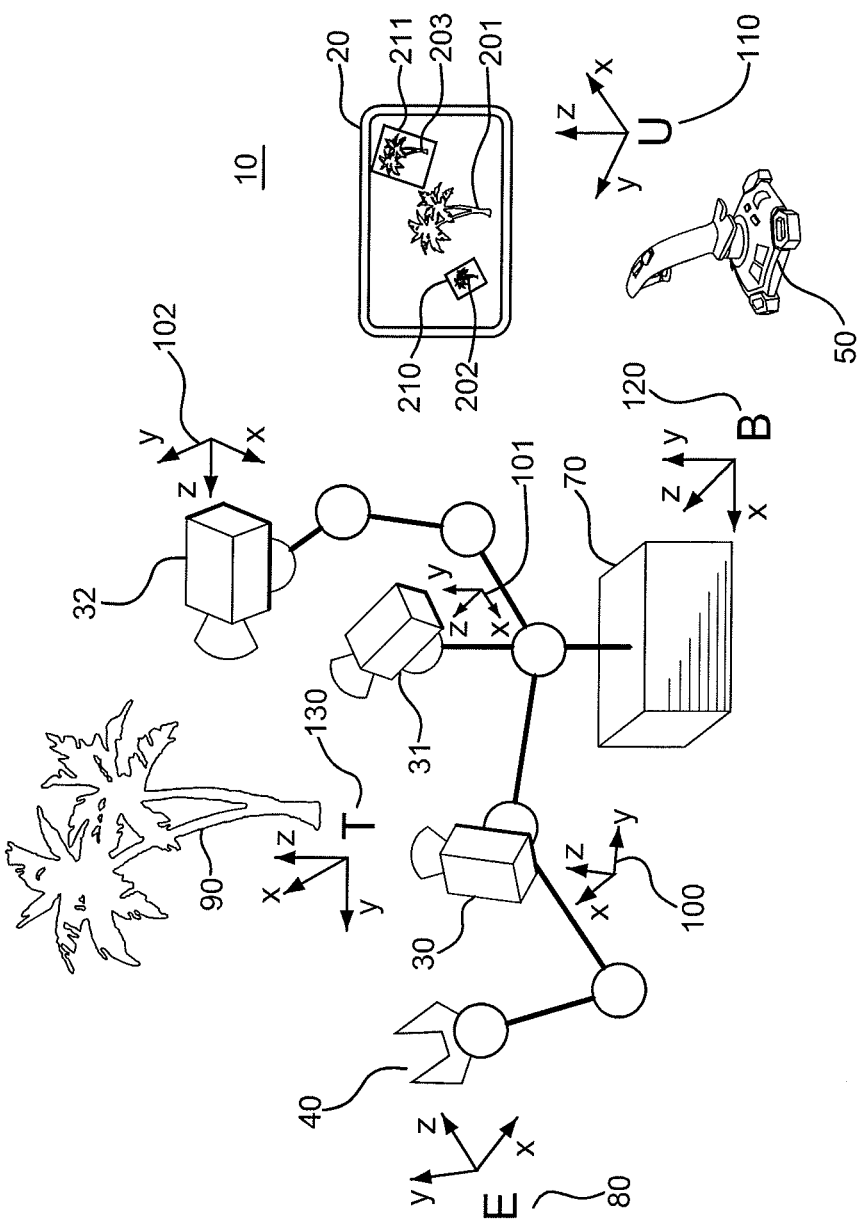
FIG. 1 is an illustration of a robotic system having multiple image feeds, a controller, and an effector.

In an exemplary embodiment of a robotic system 10, as illustrated in FIG. 1, there is, as part of the system, a user interface 20, a platform or base 70, a plurality of image, visual or camera feeds 30, 31, 32, a controller 50 for the operator to control the robotic system 10, and an effector 40. The use of the term "image feed" or "visual feed" is intended to include all types of image, video, visual or other sensing data feeds. Such data feeds may include, without limitation, infrared data, range sensing data, 3-D point clouds, 3-D computer aided design ("CAD") data, and other sensor modalities that may be used to create simulated or artificial visual objects.

The user interface 20 may be a graphical user interface such as a flat screen terminal or similar visual screen. The plurality of image feeds 30, 31, 32 may be video camera feeds, or image feeds, or other data feeds. The controller 50 may be one or more of a joystick, 2-dimensional or 3-dimensional mouse, touch screens or displays, tactile sensors, keyboards, a voice activated controller, and/or other switches, actuators or sensors that sense input commands. The purpose of the controller 50 is to control the position and/or movement of the robot base 70, the image feeds 30, 31, 32, and/or the effector 40.

Each of the image feeds 30, 31, 32 has an associated reference frame 100, 101, 102. Similarly, the controller 50 has an associated reference frame 110, as does the base 70, being base reference frame 120. To assist in describing the aggregation method and the mapping method, it is helpful to show the robotic system in relation to, or interchanging with a target object 90, which has its own reference frame 130.

Aggregation of Multiple Image Feeds

Figure 2A:
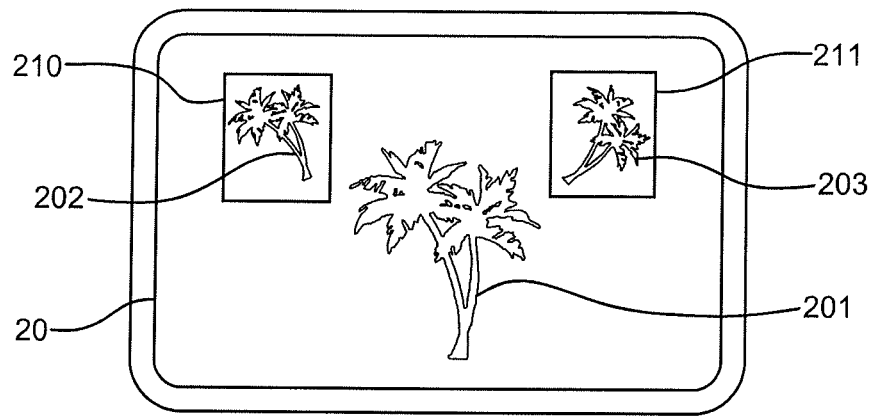
FIGS. 2A-2C are illustrations of an operator's view of an aggregation of multiple image feeds without, and with, reference frame correction in accordance with an exemplary embodiment of the present invention.

For the system illustrated in FIG. 1, where the three image feeds 30, 31, 32 are each directed to the target 90, an example of the images that may be shown to the operator through the user interface 20 is shown in FIG. 2A. The middle camera or image feed 31 shows the image 201 of target 90 in the middle of interface 20. The left image feed 30 shows the image 202 of target 90 to the left side of the interface 20. Similarly, the right image feed 32 shows the image 203 of the target 90 to the right side of the interface 20. As shown in FIG. 2A, the left image feed 30 and right image feed 32 are framed 210, 211 by an image to separate such images from the remainder of the image from image feed 31. This example layout of the user interface 20 is but one example of the various ways of combining image feeds 30, 31, 32 into a single user interface screen.

As shown in FIG. 2A, and as is typical in prior art systems, the left and right image feeds are shown with the framing 210, 211 shown in a horizontal orientation. Because the left image feed 30 and right image feed 32 are aimed at the target 90 at an angle, as shown in FIG. 1, the target object 90 appears tilted to the horizon. In this prior art example, the operator is required to mentally transform the images presented for the left image feed 30 and right image feed 32 to correctly interpret the relationships between the three image feeds 30, 31, 32.

Figure 2B:
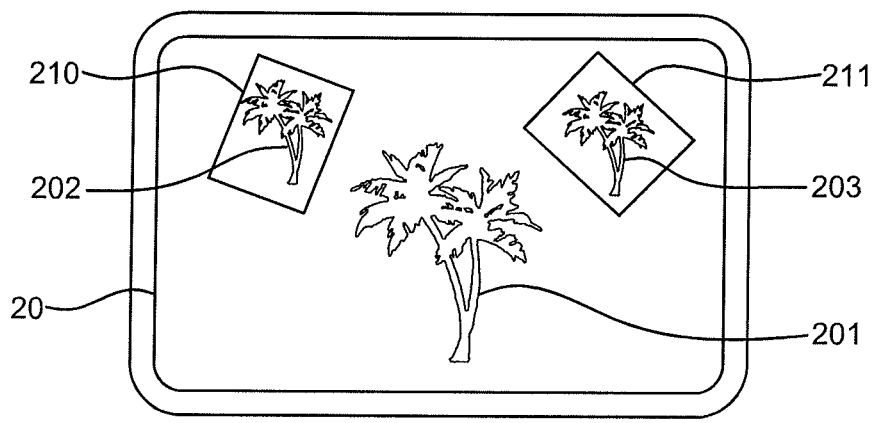

In a preferred embodiment of the invention, to reduce the operator's workload, and to provide the operator with enhanced situational awareness, the image feeds from the left camera 30 and right camera 32 may be transformed by a vertical pose correction. FIG. 2B shows the user interface 20, now having the image feed of the left camera 30 and right camera 32 vertically transformed to align the target 90 consistent with the reference frame of the middle camera 31. As shown in FIG. 2B, the three images 201, 202, 203 of the target 90 are all now vertically aligned. Because the left and right image feeds have now been vertically transformed, the associated framing around images 202 and 203, being frames 210 and 211, are similarly tilted away from a pure horizontal orientation. With the tilt of the frames 210, 211, the operator is provided with further situational information about the relative orientation of the left and right cameras.

Figure 4:
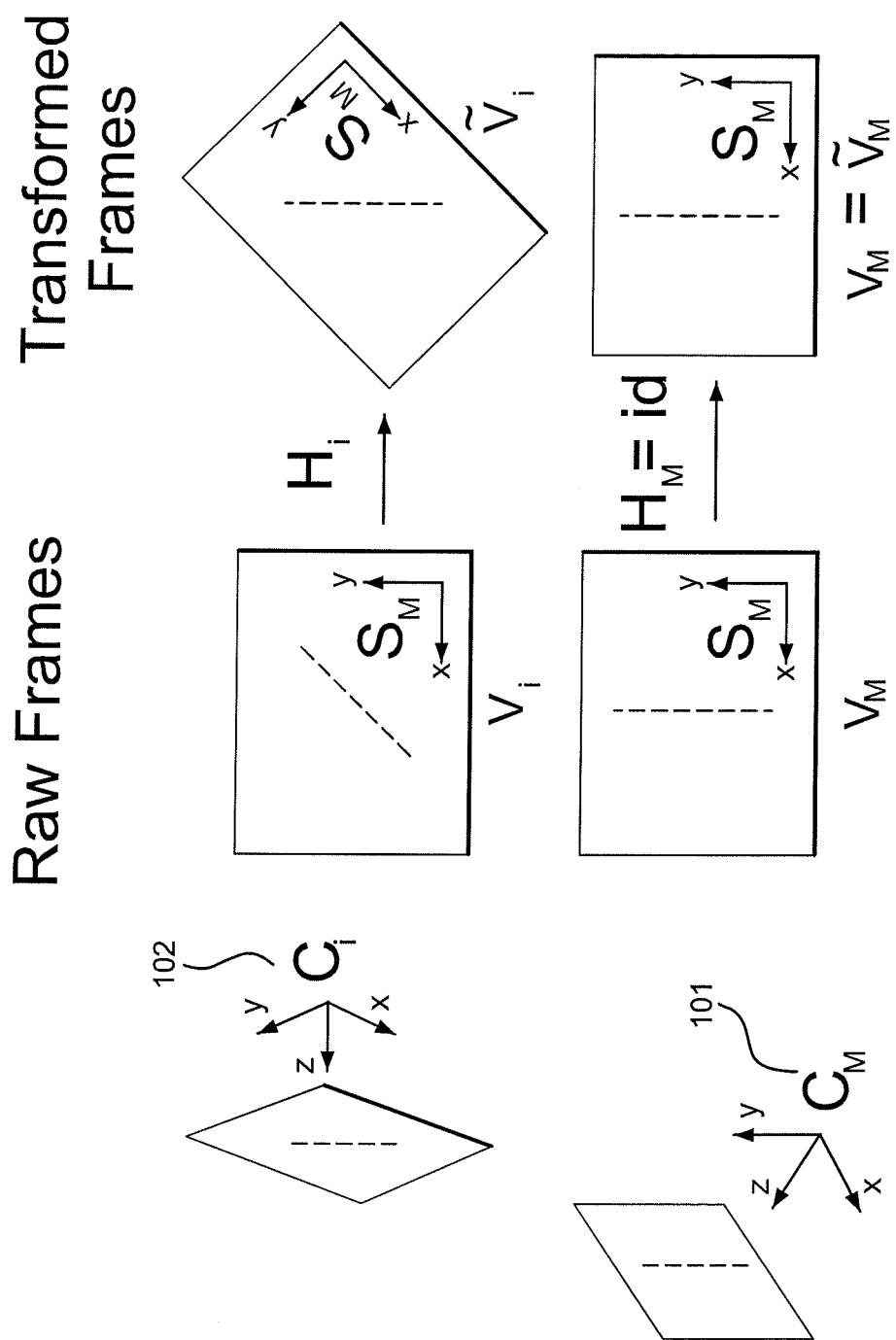
FIG. 4 is an illustrative comparison of the steps to transform multiple image feeds into a single combined image in accordance with an exemplary embodiment of the present invention.

FIG. 4 further explains and illustrates the vertical pose correction describe in FIG. 2B. More particularly, the image feed from the middle camera 31 is shown in the bottom of FIG. 4, while the image feed from the right camera 32 is shown at the top of FIG. 4. The transforming of the right image feed to correct it vertically to align with the middle camera requires a rotation of the image feed (and rotation of the associated reference frame) by a certain angle to now align the right camera feed 32 with the middle camera feed 31.

Figure 2C:
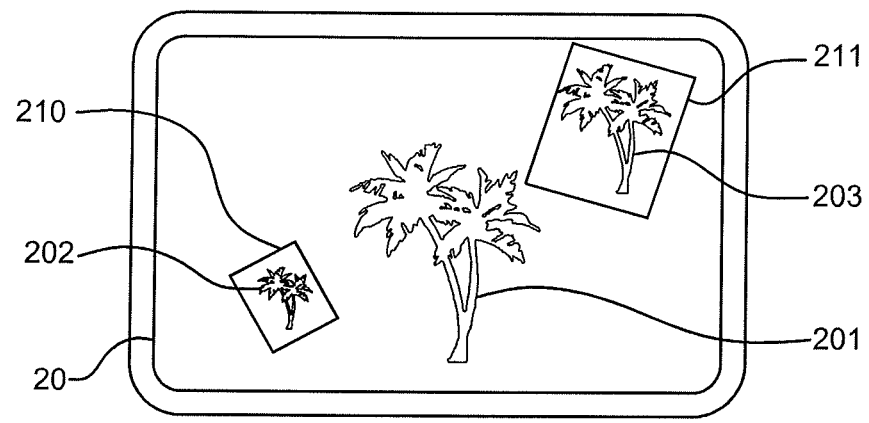
Figure 2D:
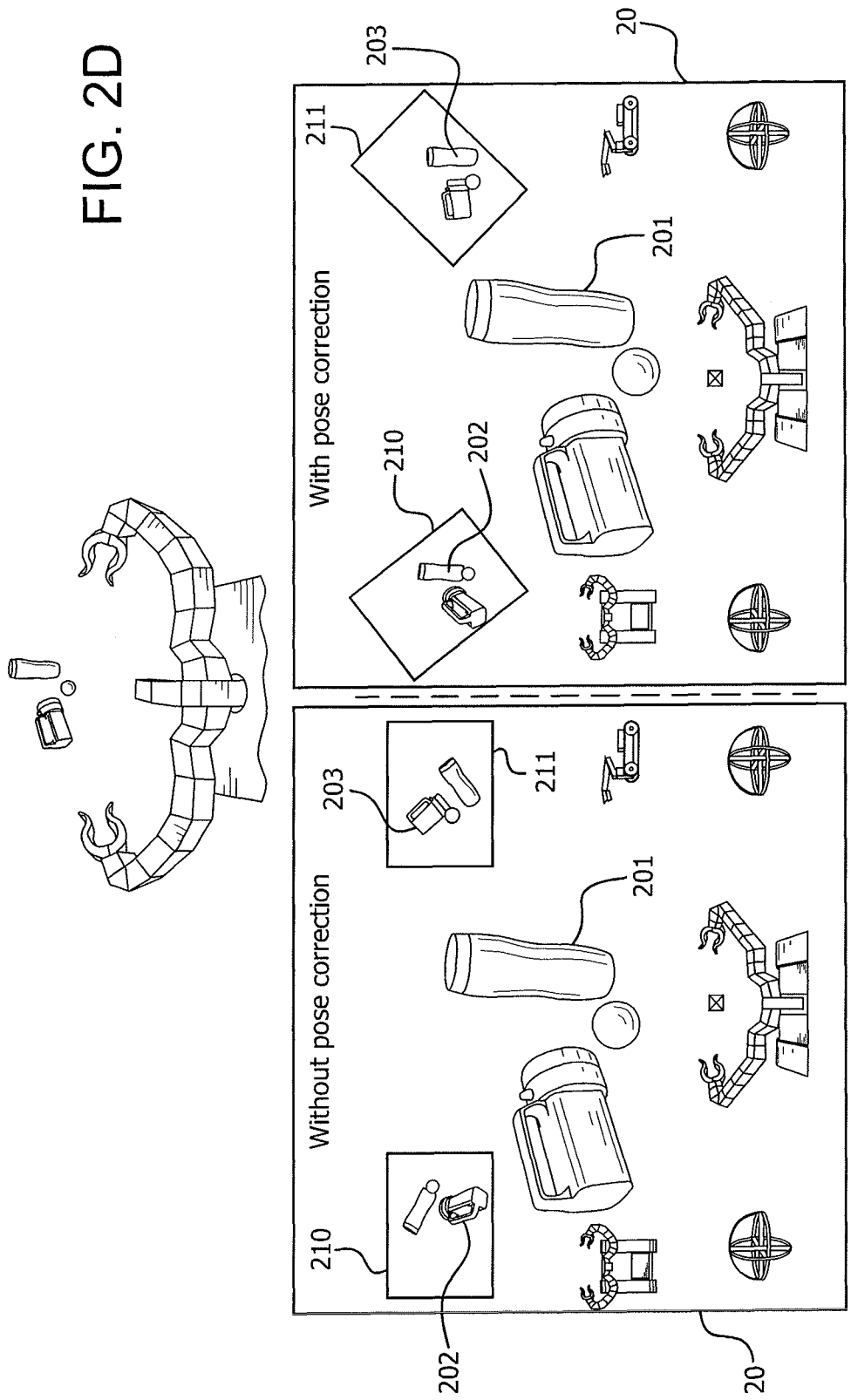
FIG. 2D is a photograph exemplary embodiment of an operator's aggregated display without and with vertical pose correction to the aggregated image feeds in accordance with an exemplary embodiment of the present invention.

The image information provided in FIG. 2B, as compared to FIG. 2A provides the operator with multiple corrected views of the target 90, along with the relevant orientation cues that reduce the operator workload, and reduces or eliminates the need for the operator to mentally process the images and align them within his or her mental image. Such processing by the invention reduces operator fatigue and improves overall situational awareness by the operator. An exemplary embodiment of a user interface display 20 showing the aggregated image feeds with and without a vertical pose correction is shown in FIG. 2D. The left-hand side display in FIG. 2D shows in the upper left-hand and upper right-hand superimposed image feeds the uncorrected visual. The right-hand side display in FIG. 2D shows the superimposed image feeds 202, 203 with vertical pose correction, and with the image frames 210, 211 angled according to the vertical correction to bring the target 90 into a vertically consistent orientation. Such correction reduces the workload required of the operator to mentally process such an angle correction.

Figure 3:
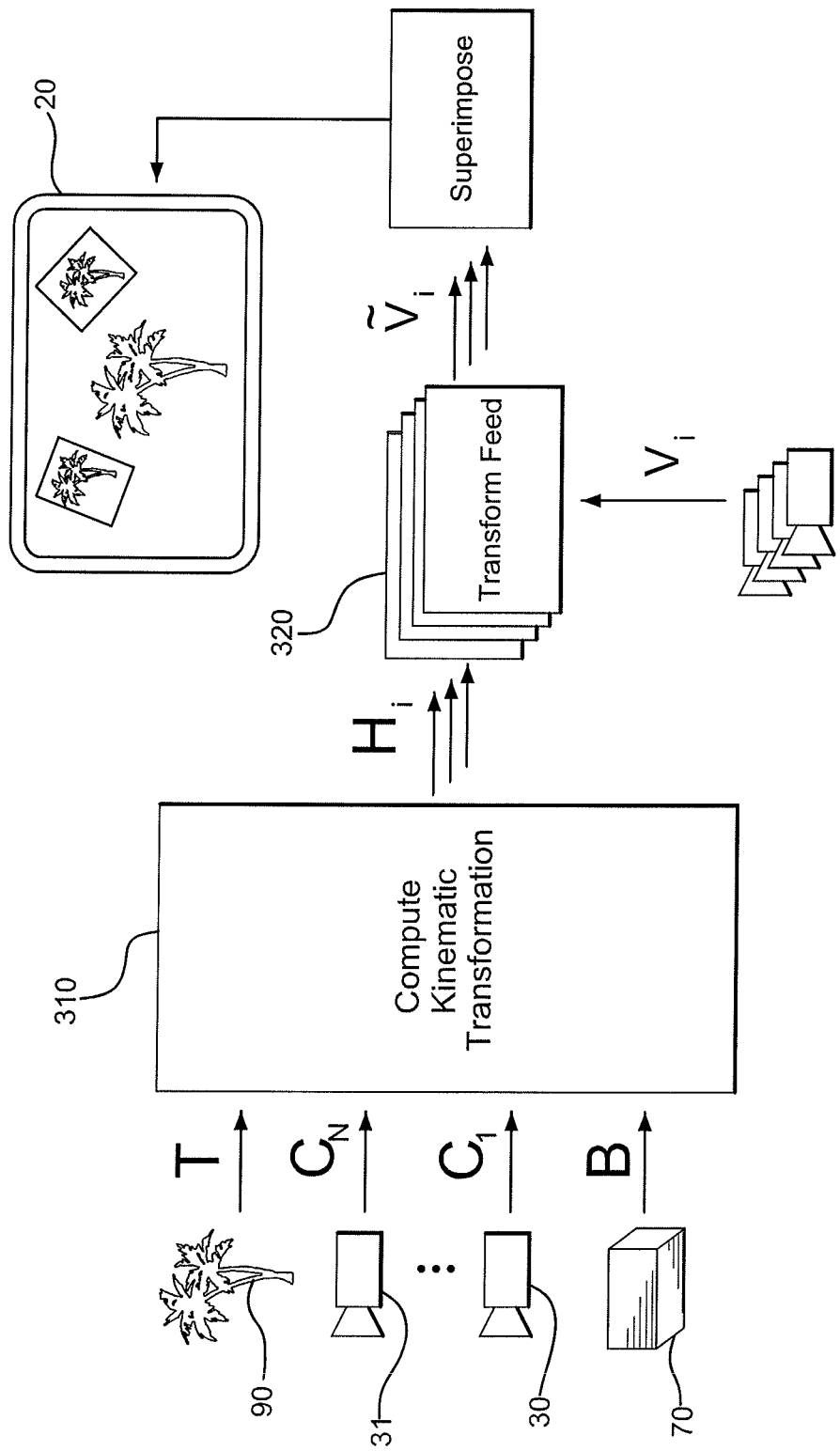
FIG. 3 is an illustrative system flow showing the steps to transform and aggregate multiple image feeds into a single combined image in accordance with an exemplary embodiment of the present invention.

In a preferred embodiment, the process through which the inventive system transforms the plurality of image feeds, and then aggregates such transformed image feeds is as illustrated in FIG. 3. As described above, the image feeds 30, 31, 32, the base 70 and the target 90 each have associated reference frames. There are kinematic relationships between each of these reference frames. Those kinematic relationships between the reference frames are either partially or fully known.

Within the inventive process, the image feeds to be aggregated into a single image must first be identified and selected. After identification of the image feeds to be aggregated, the kinematic relationships between each of the image feeds, the base, and the target 90 are to be identified and determined. With the kinematic relationships known, the process next computes the kinematic transformations that are required to transform the image feeds to the desired reference frame, which could be a vertical alignment or some other reference orientation. The computed kinematic transformations are next applied to the respective image feeds, and the transformed image feeds are then combined into a single image display or feed as shown in FIG. 2B. An illustrative system flowchart of this process is shown in FIG. 3.

Figure 5:
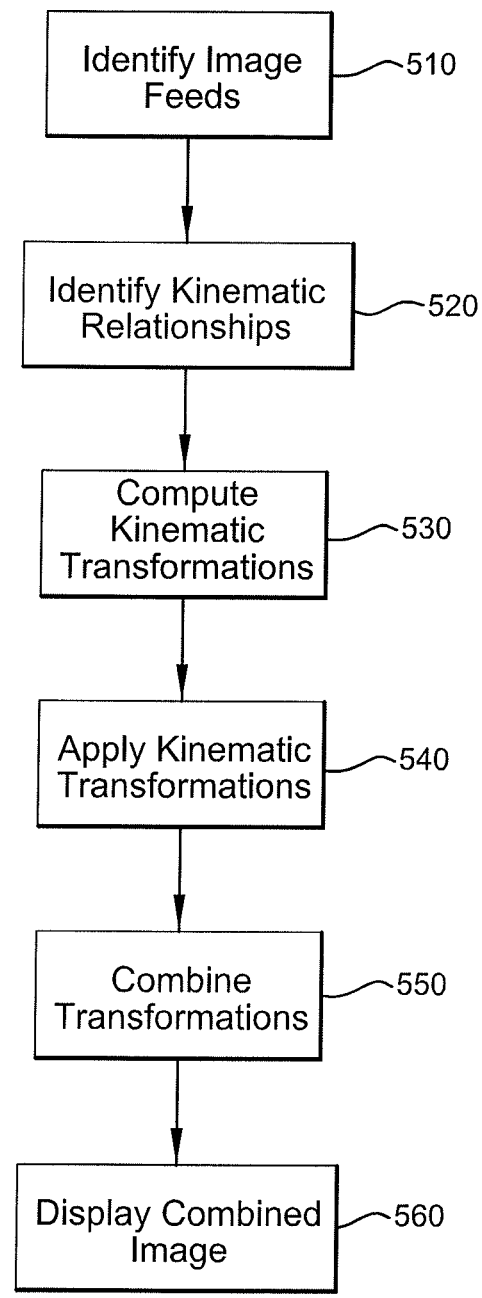
FIG. 5 is a block diagram of the method steps to transform and aggregate multiple image feeds into a single combined image in accordance with an exemplary embodiment of the present invention.

Further, FIG. 5 shows a preferred embodiment of the system and process flow. As noted, the first step 510 is the identification of the image feeds to be aggregated. Next, the kinematic relationships as between the identified image feeds are identified 520. With the identified image feeds and inter-related kinematics, the next step 530 is to compute the transformations necessary to interrelate the image feeds. The process next applies 540 the computed transformations to each of the image feeds to be transformed. The transformed image feeds are combined 550 or aggregated into a single image display to be presented or displayed 560 to the operator.

While the preferred embodiments described above related to the orientation of multiple image feeds, there are other image feed or data feed transformations that are within the scope of the invention that are useful to system operators. By way of example, a preferred embodiment transformation may be to kinematically transform the location of image 203 or 202 based upon the location of the associated reference frame. Similarly, in another preferred embodiment, transformation may include to increase or reduce the size of image 203 or 202 based upon the relative location of the associated reference frame. The aggregated image showing both of these transformations in illustrated in FIG. 2C.

The process of computing the kinematic relationships between the image feeds, and computing the transformations of the image feeds may be undertaken in real-time as the operator is manipulating the robot or interchanging with the target object 90. Such real-time transforming and aggregating of multiple image feeds results in greatly improved operator situational awareness, reduced operator fatigue, and reduced task completion times.

Figure 6A:
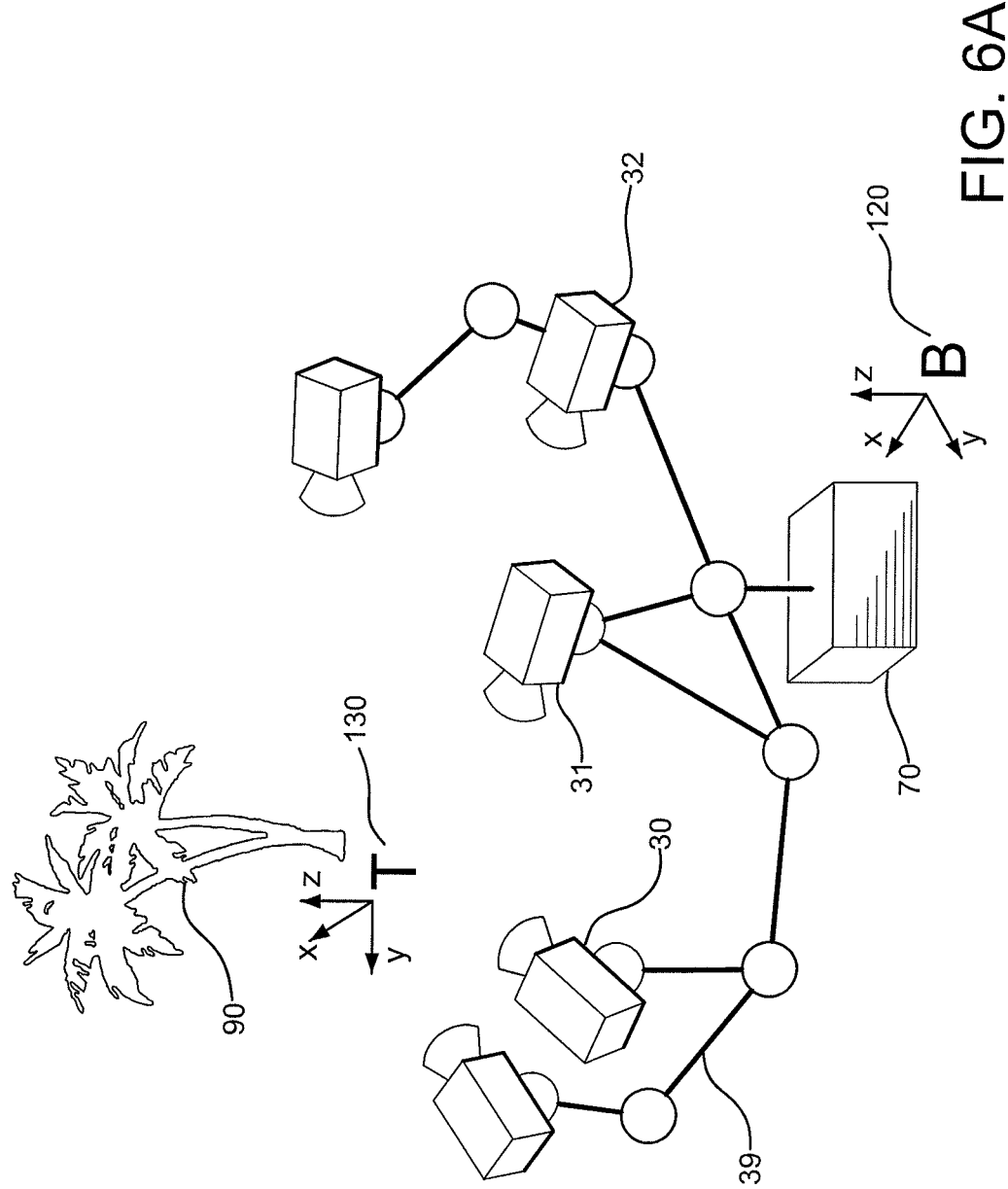
FIGS. 6A-6B are illustrations of robotic systems having multiple image feeds that are physically interconnected or distributed and not interconnected in accordance with an exemplary embodiment of the present invention.
Figure 6B:
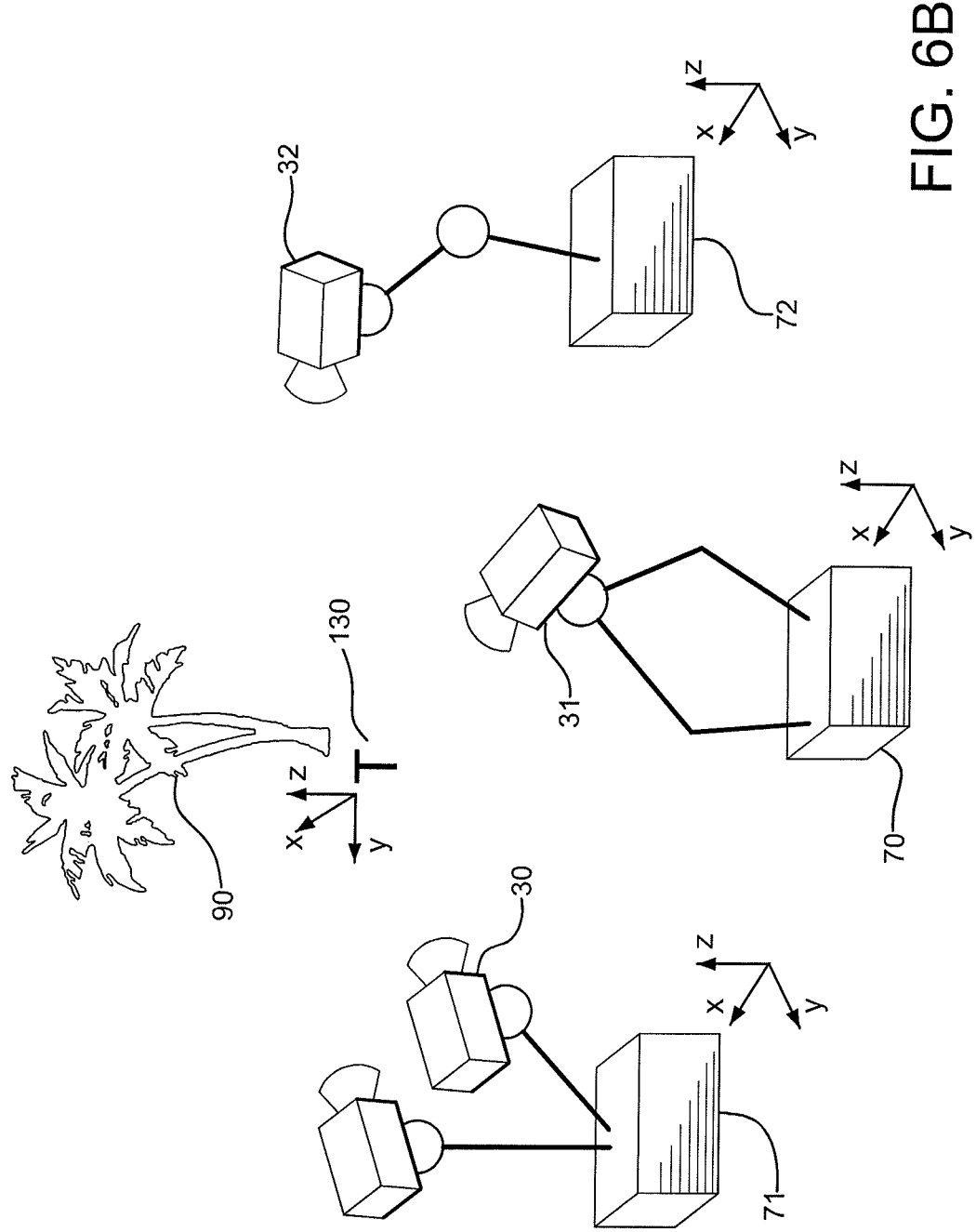

The inventive method and system is not limited to three image feeds or physically interconnected image feeds. Indeed, there are many other configurations that use two or more image feeds, having known kinematic relationships to each other, to the target and to the base platform. Such exemplary embodiments include, as illustrated in FIG. 6A, a series of cameras 30, 31, 32 all connected by a single kinematic chain 39 to a single base 70, or as illustrated in FIG. 6B, a series of cameras 30, 31, 32 that are physically distributed from each other, and having distributed bases 70, 71, 72. The inventive method is equally applicable to either of these configurations, or any combination of these configurations that may or may not have effectors 40.

Dynamic Selection of Command Reference Frame

Referring back to the robotic system 10 illustrated in FIG. 1, there is a user interface 20, a platform or base 70, a plurality of image or camera feeds 30, 31, 32, a controller 50 for the operator to control the robotic system 10, and an effector 40. Each of the image feeds 30, 31, 32 has an associated reference frame 100, 101, 102. Similarly, the controller 50 has an associated reference frame 110, as does the base 70, being base reference frame 120, and the effector 40 has an associated effector reference frame 80. As noted above, to assist in describing the aggregation method and the mapping method, it is helpful to show the robotic system in relation to, or interchanging with a target object 90, which has its own reference frame 130.

The kinematic relationship, and therefore the mapping of one element reference frame to another reference frame is partially or completely known from sensor data provided by sensors located on or proximate to the robot. By way of example, an input along the y-axis (directly forward) of the controller 50 may translate and be mapped to one of, or a combination of x, y, and z-axis commands for the effector 40 as a function of kinematic relationship at any given time between the controller 50 and the effector 40. Similar relationships are known, at any given time, between the controller 50 and the image feeds 30, 31, 32, and/or the base 70.

The operator controls the robotic system 10, and the various elements, including the effector 40 and the image feeds 30, 31, 32 through use of the controller 50. Again, the controller 50 can one of, or a combination of many different types of controllers including joysticks, 2 or 3-dimensional mouse controllers, touch screens, or other switches, actuators or sensors that sense input commands. As noted, the purpose of the controller 50 is to provide input commands to control the position and/or movement of the base 70, cameras/image feeds 30, 31, 32, and/or the end effectors 40.

Figure 9:
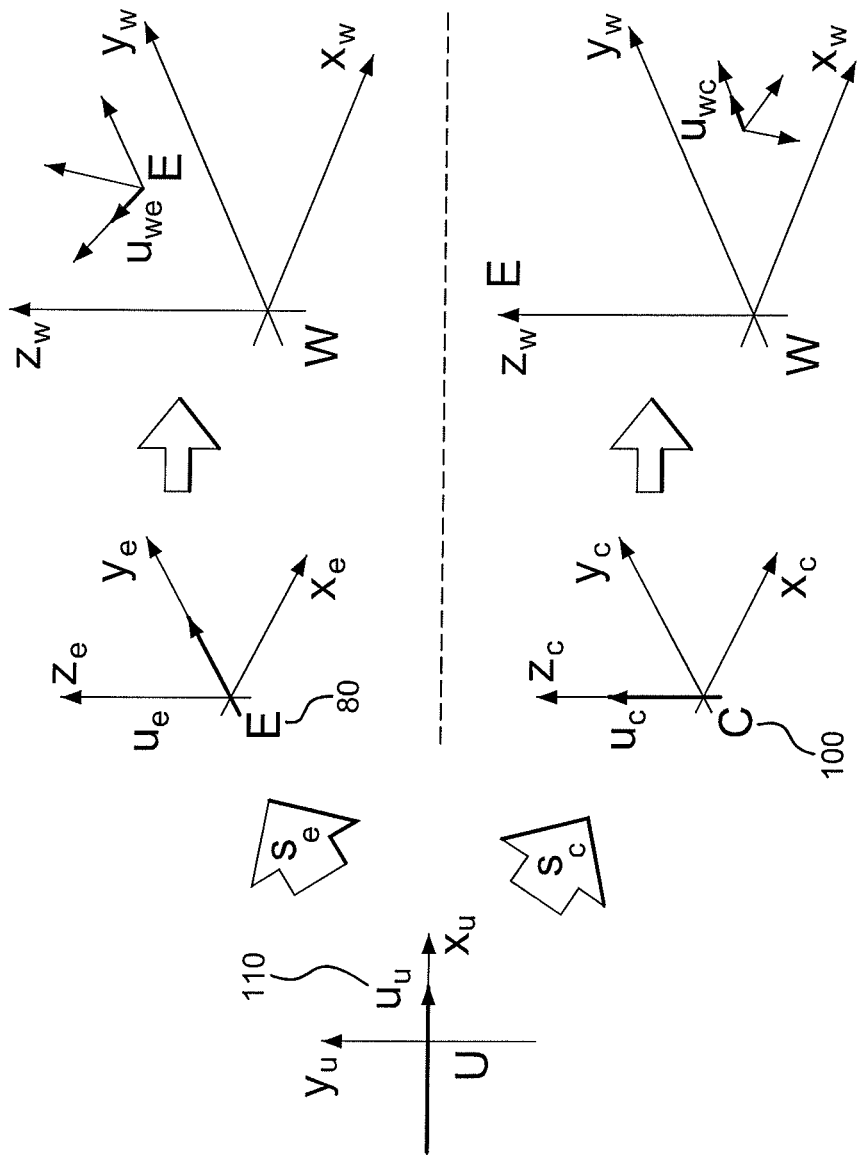
FIG. 9 is an illustrative comparison of the steps in mapping control inputs to a selected reference frame in accordance with an exemplary embodiment of the present invention.

The inventive method and system takes the commands as entered by the operator to the controller 50, being raw commands, as interpreted for the controller reference frame 130, and then maps those commands to another selected reference frame. More particularly, as illustrated in FIG. 9, an input to the controller 50 sensed through the controller reference frame 110, may be mapped to the effector 40 or a camera 30, and their associated reference frames 80 and 100 by a mapping kinematic relationship.

Figure 8:
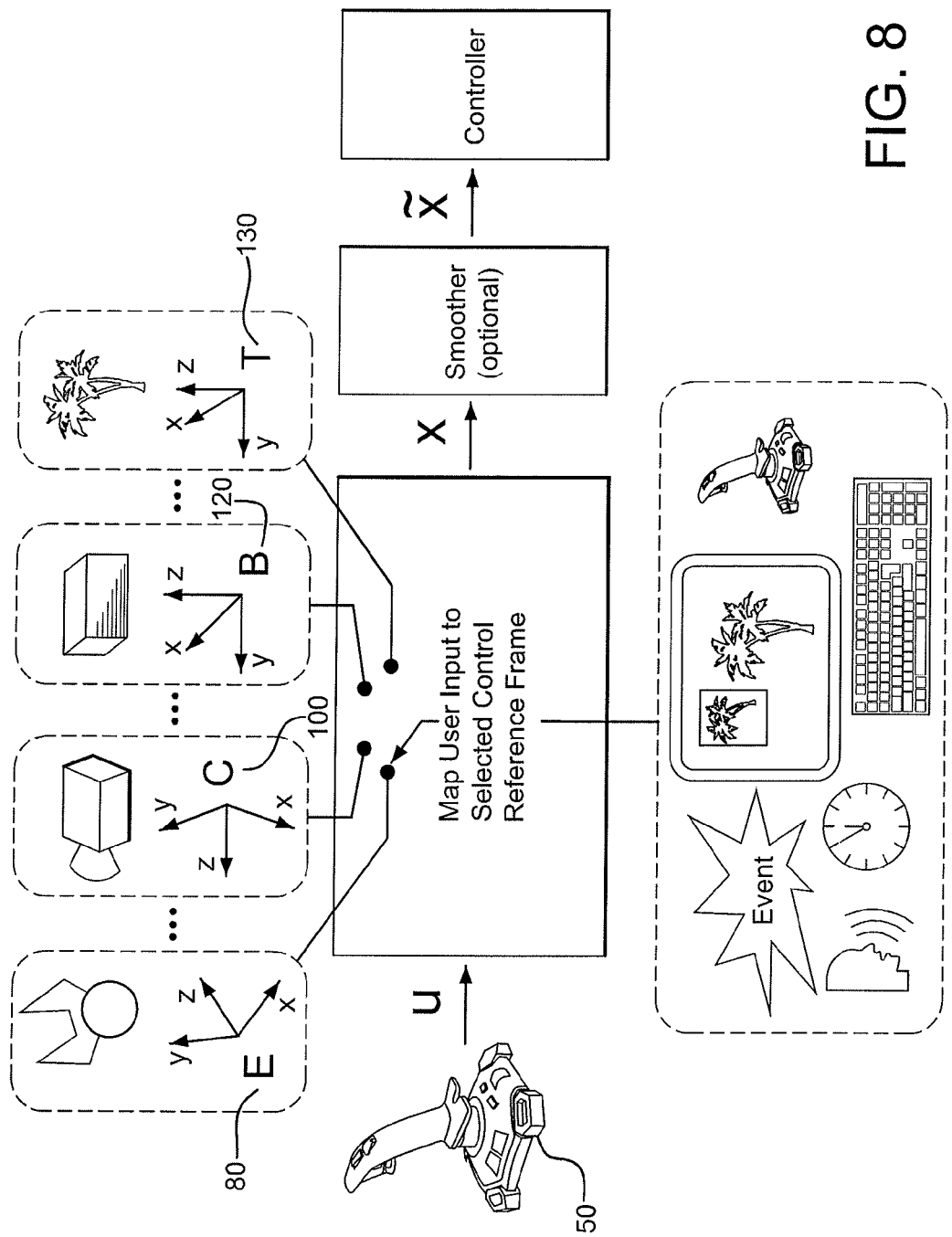
FIG. 8 is an illustrative system flow showing the steps to map and smooth command inputs as a function of selected reference frames in accordance with an exemplary embodiment of the present invention.

FIG. 8 illustrates the steps for a preferred embodiment of the inventive system for mapping command inputs to selected reference frames. As shown, the controller 50 input is first sensed. The system processor also senses and maintains the reference frames of the other elements of the system, which may include the effector 40, image feeds 30, 31, 32, the base or platform 70, and the target 90. The system processor computes the mapping relationships between the controller reference frame, and the reference frames for the other system elements. With these computed mapping relationships, the processor is able to map the command inputs sensed from the controller to any of the other reference frame elements that may be selected by the operator. As illustrated in FIG. 8, the reference frames of the several system elements, including effector reference frame 80, camera reference frame 100, base reference frame 120, and target reference frame 130 need not be oriented with each other. Such differences in the orientations of the system element reference frames result in the need for the mapping relationships from the controller 50 to any of the other system elements.

Figure 7:
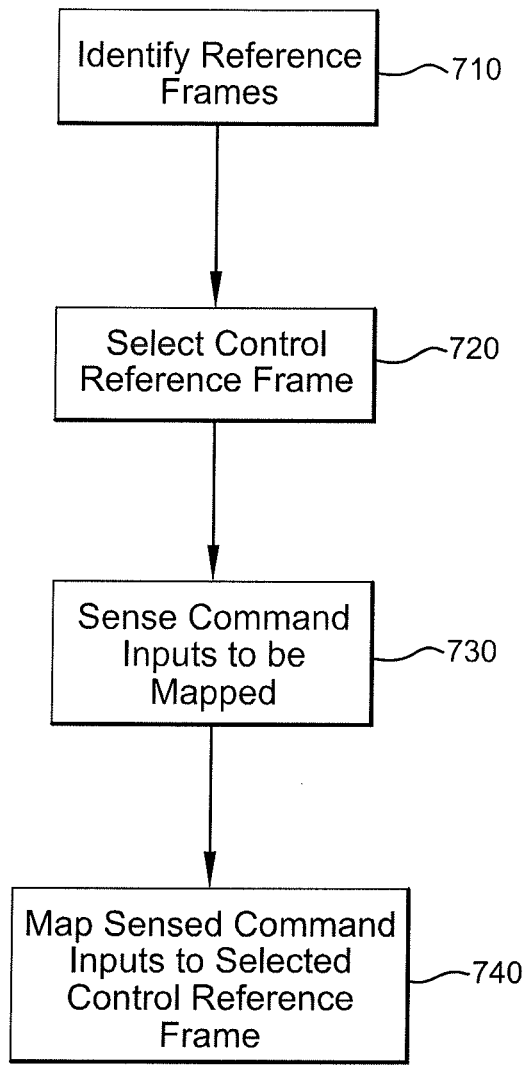
FIG. 7 is a block diagram of the method steps to map control inputs to a task space using a selected reference frame in accordance with an exemplary embodiment of the present invention.

By way of a preferred embodiment of the method steps, the system first identifies two or more reference frames to which user commands may be mapped, which may include the robot base reference frame, the effector reference frame, one or more of the camera reference frames, or the world reference frame. Next, the operator selects the control reference frame, to which control inputs will be mapped. The sensed user commands that are input through the controller 50 are then mapped from the input device (and its associated reference frame) to the control reference frame (and its associated reference frame). More particularly, FIG. 7 shows a process flow chart for these steps. In step 710 the system processor identifies the system elements and associated reference frames. Next the operator selects 720 the control reference frame to which control inputs are to be mapped. The system senses 730 the input commands entered by the operator to the controller 50, and then the system processor maps 740 the sensed input commands from the controller 50 reference frame onto the control reference frame using the known kinematic relationship between the controller reference frame and the selected reference frame.

The selection of the control reference frame is not limited or restricted in time. The operator may desire to, and can select different control reference frames while he or she is completing the desired task. Such selections can change as the task is undertaken. By way of example, the operator may select the middle camera as being the control reference frame at the beginning of the task, but may then shift and select the left or right camera as the control reference frame as the task continues, and still further, the operator may select the effector reference frame as the control reference frame near the end of task when fine control of the effector 50 is necessary. In a preferred embodiment, the camera 30 (or 32 as illustrated in FIG. 1) may be co-located with an end effector 40 to assist the operator with enhanced situational awareness as to that effector 40, and accordingly in precise manipulation and control of the end effector 40.

The inventive system permits the operator to change control reference frames as the task is undertaken, with such selection being accomplished in real-time. Such dynamical selection of control reference frames can be implemented automatically for automated visually driven system, which simplifies controller design and implementation.

Figure 10:
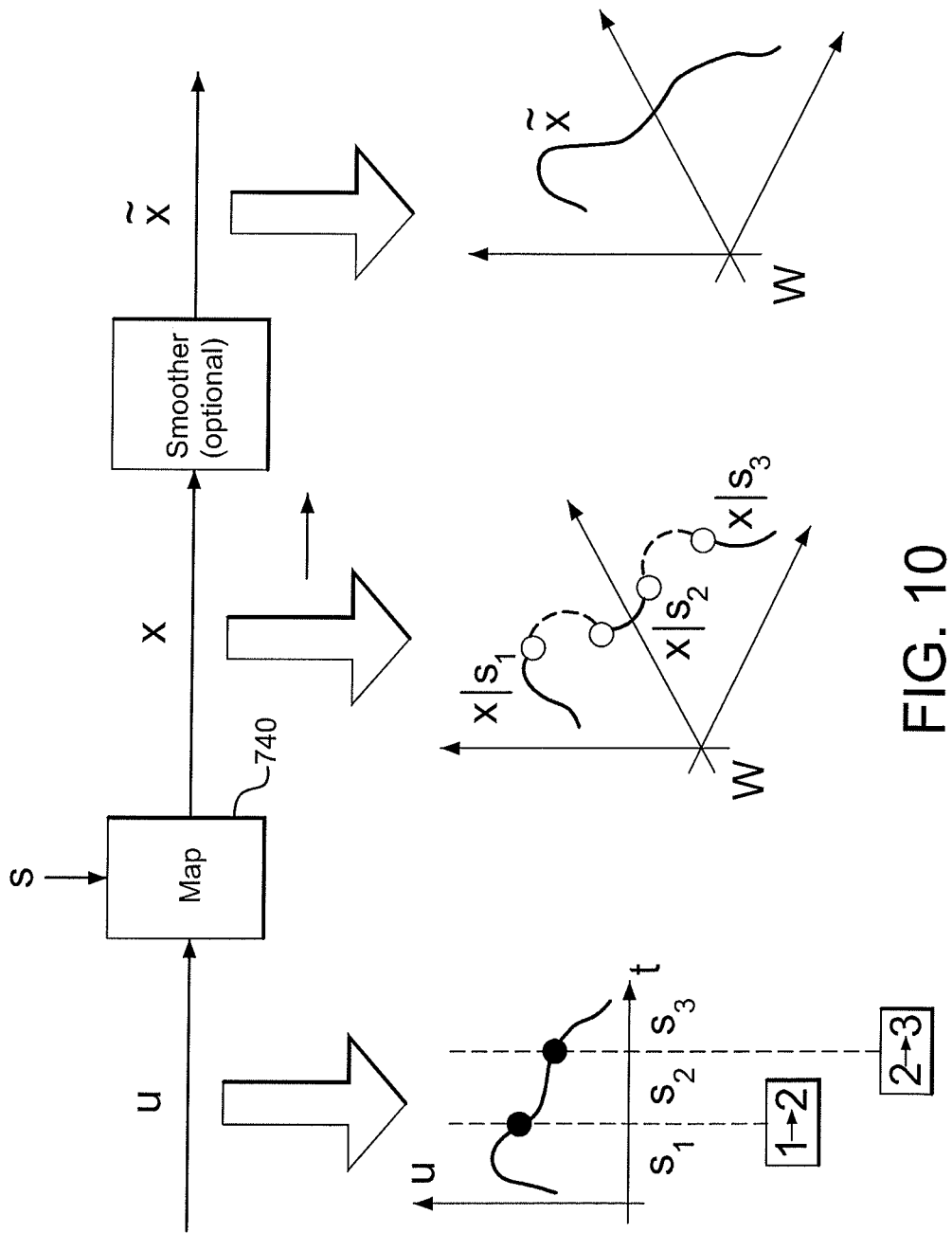
FIG. 10 is an illustration of use of smoothing function to interpolate between varied control inputs for different control reference frames.

With such real-time selection of control reference frames, the control inputs to an effector 50 for example, may be non-linear or result in piece-wise signals being transmitted to a system element, such as an effector. To accommodate the possible need to address such non-linear or piece-wise signals, in a preferred embodiment, a smoothing function or smoothing step may be incorporated after the mapping step. As illustrated in FIG. 10, the smoothing steps interpolates between the end point of the prior control reference input, and the first point of the next control reference input.

Figure 11A:
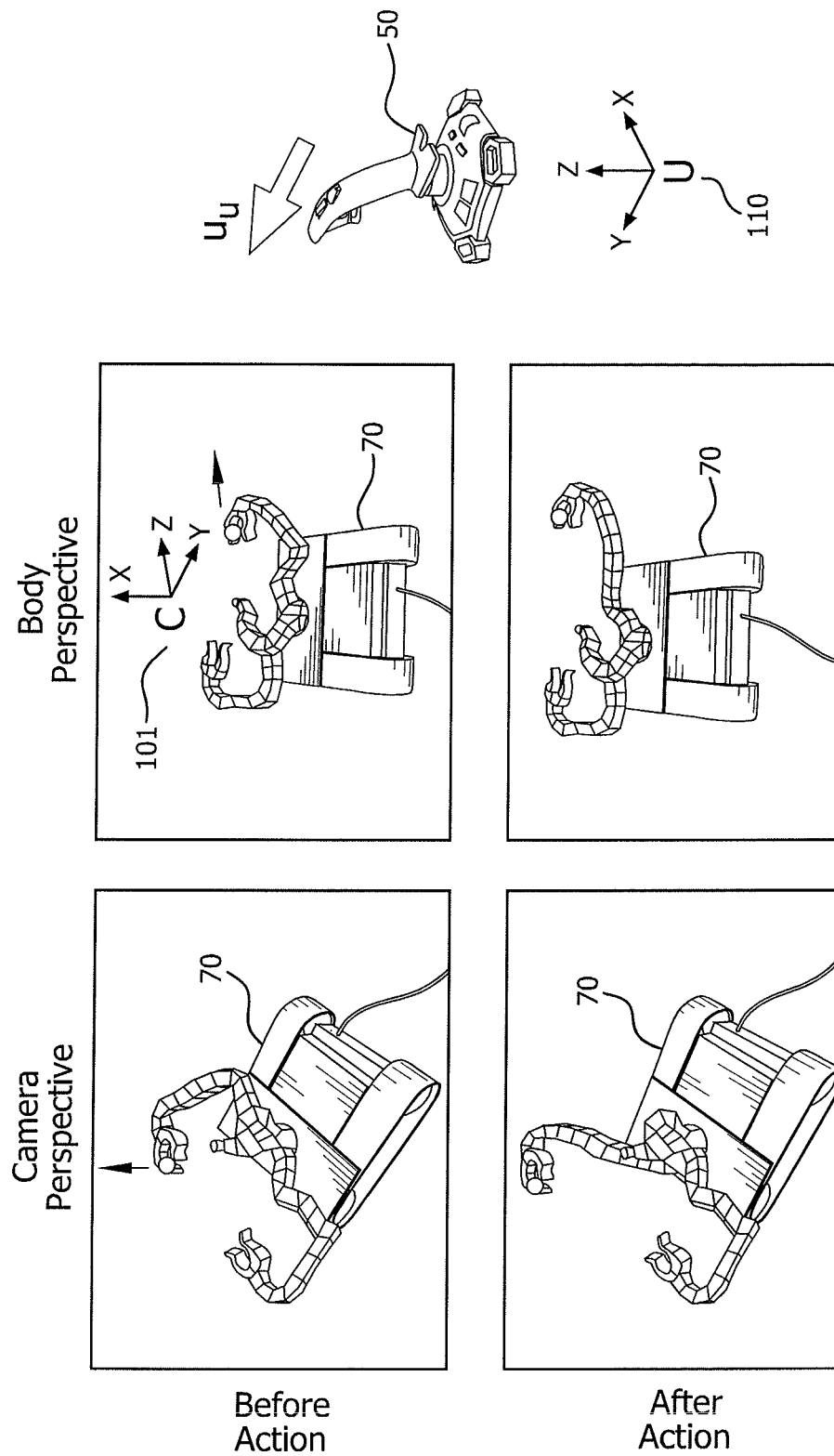
FIG. 11A is a comparative example of the resulting system output (arm movement) for a forward controller input when mapping the input to the camera reference frame.
Figure 11B:
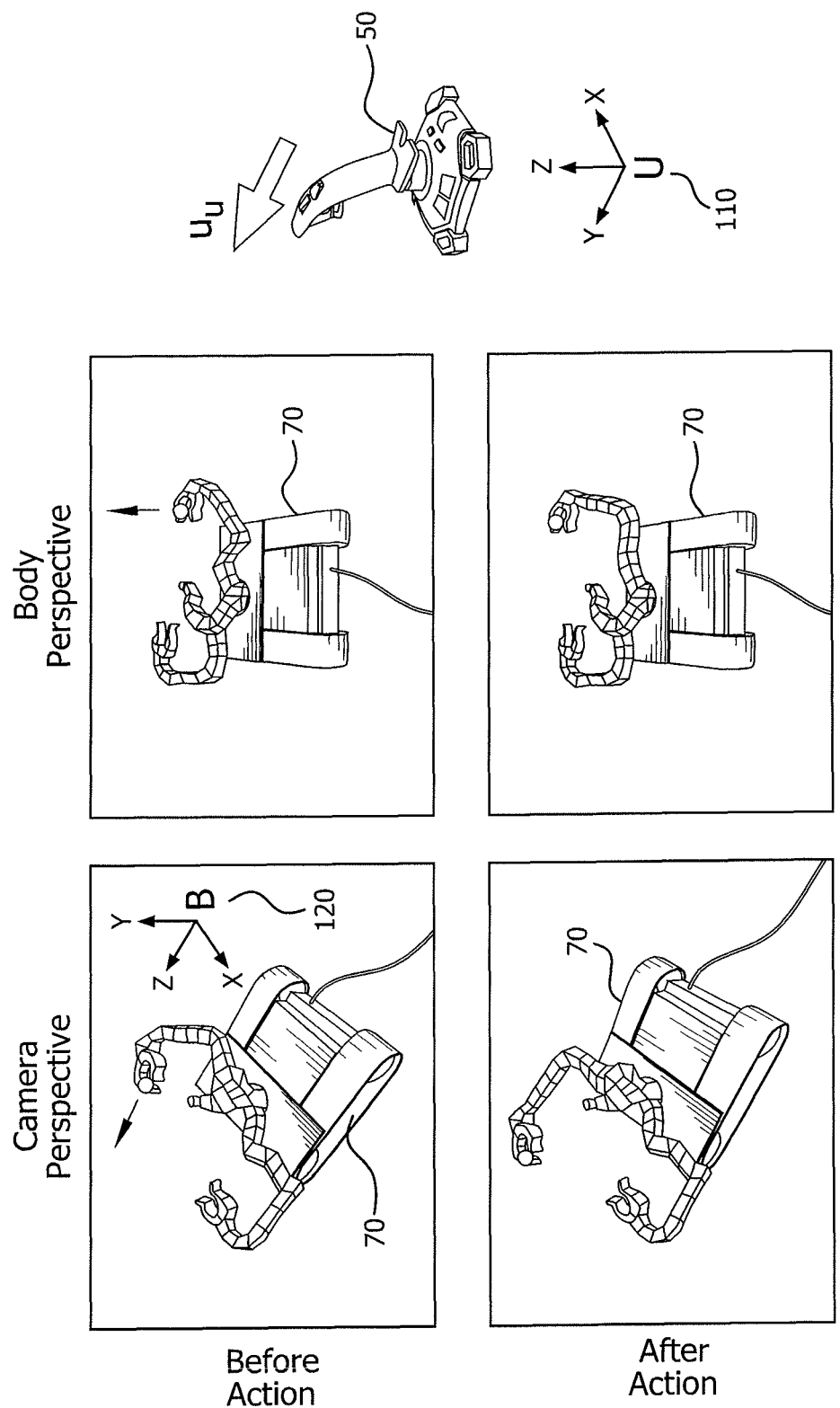
FIG. 11B is a comparative example of the resulting system output (arm movement) for a forward controller input when mapping the input to the base reference frame.

FIGS. 11A, 11B show an example of the different system element movements resulting from the same controller 50 input as function of whether the control reference frame is the system platform or base, or a camera reference frame. Where the operator has selected the middle camera as the control reference frame, then a y-axis input (directly forward) on the controller, results in the right arm moving directly away from the camera as shown in the two left-hand side images taken from the middle camera perspective. The two right-hand side images in FIG. 11A show the same before and after arm placements from the body perspective. This arm movement is forward and to the right from the body 70.

By comparison, where the operator has selected the platform or base 70 as the control reference frame, then the same y-axis input (directly forward) on the controller, results in the right arm moving directly away from the base 70 as shown in the two right-hand side images in FIG. 11B. The two left-hand side images in FIG. 11B show the same before and after arm placements from the middle camera perspective. This arm movement is directly forward from the body 70.

The above methods and systems permitting aggregation of multiple image feeds to a single image, and dynamically selectable control reference frames, provide substantial advantages over the prior art. Such advantages include, without limitation significant reduction in operator workload during tele-operated scenarios. The inventive systems and methods allow the operator to intuitively control the robotic system and interact with the task without the need to mentally interpret, and translate or transform various relationships between images and feeds, or between control input and element output.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method to aggregate image feeds and map user commands, for use in control of robotic systems, comprising the steps of:
    (a) identifying at least two image feeds to be aggregated into a single image;
    (b) identifying kinematic relationships of each of the at least two image feeds as related to each other and as related to another reference frame;
    (c) computing kinematic transformations required for each of the at least two image feeds to transform such image feeds consistent with said reference frame;
    (d) applying the kinematic transformations computed to each of the respective at least two image feeds;
    (e) combining the transformed at least two image feeds into a single image, such single image having transformed and combined image feeds;
    (f) identifying at least two reference frames to which user commands may be mapped;
    (g) selecting a control reference frame from the at least two reference frames, said control reference frame having a first reference frame;
    (h) sensing user commands entered through an input device, said input device having a second reference frame; and
    (i) mapping the sensed user commands from the input device and the input device second reference frame, to the control reference frame and the control reference frame having a first reference frame.

2. The method to aggregate image feeds and map user commands, for use in control of robotic systems, as in claim 1, wherein the computed kinematic transformations may include reference frame orientation corrections, image size, and image feed location on said aggregated single image.

3. The method to aggregate image feeds and map user commands, for use in control of robotic systems, as in claim 1, wherein the computing, applying and combining steps are undertaken in real-time.

4. The method to aggregate image feeds and map user commands, for use in control of robotic systems, as in claim 1, wherein the selection of the control reference frame may be made dynamically.

5. The method to aggregate image feeds and map user commands, for use in control of robotic systems, as in claim 1, wherein the selection of the control reference frame may be made in real-time.

6. The method to aggregate image feeds and map user commands, for use in
    control of robotic systems, as in claim 4, further comprising the step of (j) smoothing the user commands where the selected control reference frame is changed.

7. A method to transform and aggregate image feeds, for use in robotics, comprising the steps of:
    (a) identifying at least two image feeds to be aggregated into a single image;
    (b) identifying kinematic relationships of each of the at least two image feeds as related to each other and as related to another reference frame;
    (c) computing kinematic transformations required for each of the at least two image feeds to transform such image feeds consistent with said reference frame;
    (d) applying the kinematic transformations computed to each of the respective at least two image feeds; and
    (e) combining the transformed at least two image feeds into a single image, such single image having transformed and combined image feeds,
    wherein the computed kinematic transformations may include reference frame orientation corrections, image size, and image feed location on said aggregated single image.

8. The method of transforming and aggregating image feeds, for use in robotics, as in claim 7, wherein said reference frame is a vertically constrained reference frame.

9. The method of transforming and aggregating image feeds, for use in robotics, as in claim 7, wherein said reference frame is a gravity constrained reference frame.

10. The method of transforming and aggregating image feeds, for use in robotics, as in claim 7, wherein said reference frame is a horizon constrained reference frame.

11. The method of transforming and aggregating image feeds, for use in robotics, as in claim 7, wherein the at least two image feeds are real-time cameras.

12. The method of transforming and aggregating image feeds, for use in robotics, as in claim 7, wherein the at least two image feeds may be data sources selected from the group consisting of infrared data, range data, 3-D point cloud data, optical data, or simulated object data.

13. The method of transforming and aggregating image feeds, for use in robotics, as in claim 7, wherein the computing, applying and combining steps are undertaken in real-time.

14. A method to map user commands to selectable system reference frames for robotic system, comprising the steps of:
    (a) identifying at least two reference frames to which user commands may be mapped;
    (b) dynamically selecting a control reference frame from the at least two reference frames, said control reference frame having a first reference frame;
    (c) sensing user commands entered through an input device, said input device having a second reference frame;
    (d) mapping the sensed user commands from the input device with a second reference frame, to the control reference frame with a first reference frame; and
    (e) smoothing the user commands where the selected control reference frame is changed.

* * * * *